(12) United States Patent
Chakra et al.

(10) Patent No.: US 10,901,665 B2
(45) Date of Patent: Jan. 26, 2021

(54) WORKGROUP MANAGEMENT OF CATEGORIZED PRINT JOBS

(75) Inventors: Al Chakra, Apex, NC (US); Liam Harpur, Dublin (IE); Mark Kelly, Dublin (IE); John Rice, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/169,998

(22) Filed: Jun. 27, 2011

(65) Prior Publication Data

US 2012/0327456 A1 Dec. 27, 2012

(51) Int. Cl.
*G06F 3/12* (2006.01)

(52) U.S. Cl.
CPC .......... *G06F 3/1219* (2013.01); *G06F 3/1222* (2013.01); *G06F 3/1239* (2013.01); *G06F 3/1285* (2013.01); *G06F 3/1255* (2013.01); *G06F 3/1273* (2013.01)

(58) Field of Classification Search
CPC .................................................. H04N 1/4433
See application file for complete search history.

(56) References Cited

U.S. PATENT DOCUMENTS

| | | | |
|---|---|---|---|
| 5,077,795 A | 12/1991 | Rourke et al. | |
| 6,985,244 B1 | 1/2006 | Bhogal et al. | |
| 7,126,704 B2 | 10/2006 | Miura et al. | |
| 2002/0175208 A1* | 11/2002 | Bartley et al. | ............... 235/380 |
| 2005/0012960 A1 | 1/2005 | Eden et al. | |
| 2006/0059128 A1* | 3/2006 | Ruggle | ............. G06Q 10/10 |
| 2008/0068641 A1* | 3/2008 | Dance et al. | ............... 358/1.15 |
| 2008/0273224 A1 | 11/2008 | Maulsby et al. | |
| 2009/0086264 A1* | 4/2009 | Yoshida | ............ H04N 1/00222 |
| | | | 358/1.15 |
| 2010/0014110 A1* | 1/2010 | Munetomo | ................. 358/1.14 |
| 2010/0097630 A1* | 4/2010 | Schwartz | ............. G06F 3/1288 |
| | | | 358/1.15 |
| 2010/0245890 A1 | 9/2010 | Chakraborty | |
| 2010/0259773 A1* | 10/2010 | Okabe | ............... G03G 15/5091 |
| | | | 358/1.9 |

FOREIGN PATENT DOCUMENTS

WO 2010034653 A1 4/2010

* cited by examiner

*Primary Examiner* — Nicholas Pachol
(74) *Attorney, Agent, or Firm* — James W. Kappos

(57) ABSTRACT

Embodiments of the present invention provide a method, system, and computer program product for managing categorized workgroup print jobs. The method includes receiving from an end user a print job designated for printing in a workgroup printer and categorizing the print job as work related or non-work related. Additionally whether or not printing the print job on behalf of the end user encroaches within a threshold value of a remaining allocation of printing resources established for the end user is determined. Finally, in response to determining both that the print job is within a specific category and also that the printing of the print job on behalf of the end user encroaches within the threshold value of the remaining allocation of printing resources established for the end user, further processing of the print job can be restricted.

18 Claims, 1 Drawing Sheet

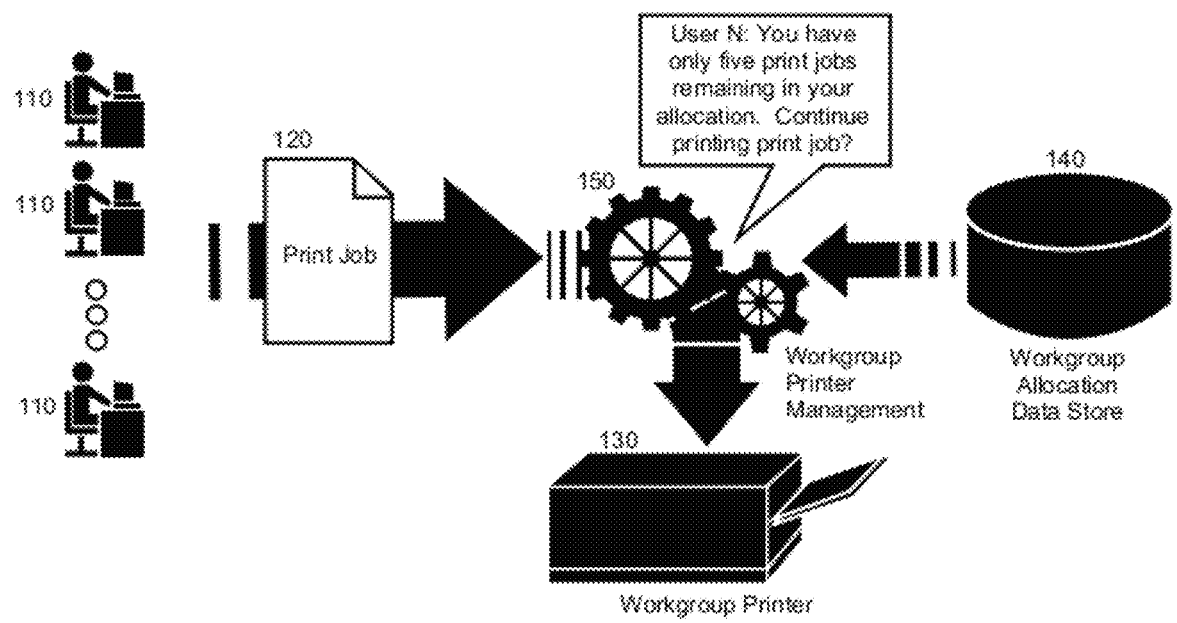
FIG. 1
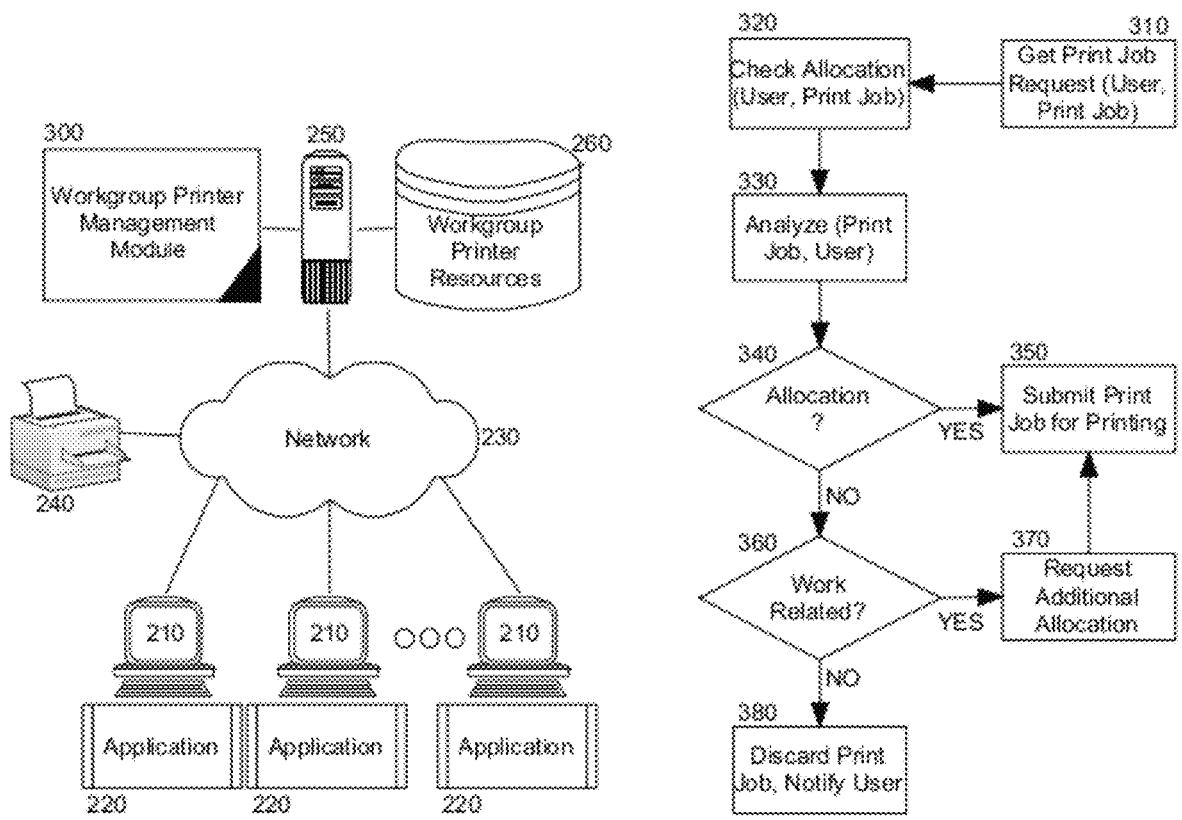
FIG. 2  FIG. 3

WORKGROUP MANAGEMENT OF CATEGORIZED PRINT JOBS

BACKGROUND OF THE INVENTION

Field of the Invention

The present invention relates to workgroup printer management and more particularly to restricting workgroup printing for categorized print jobs.

Description of the Related Art

The computer as a tool of productivity depends upon the ability to print in order to derive the true value of data processing. Historically, printing data in a computing system required the direct coupling of a printer and the formatting and transfer of a document to the printer from the computer for printing. Subsequent advances in printing now permit printing through the indirect coupling of a printer to a computer including network attached printers and wirelessly accessible printers. Of note, workgroup printing remains part and parcel of the traditional corporate printing strategy so as to permit multiple employees to access a single printer over a computer communications network.

In workgroup printing, different computers of correspondingly different user members of a workgroup are configured to direct print jobs to a common workgroup printer communicatively coupled to the different computers over a local area network. Security for the common workgroup printer can range from none to substantial. In this regard, for the more controlled workgroup printing environment, the number, nature and timing of submitting and processing print jobs can be administered in advance by a network administrator charged within managing the workgroup.

In this regard, to the extent that printing resources such as toner and paper can be costly, as a matter of policy end users can be restricted to printing only a certain number of pages over a fixed period of time. Additionally, so as to avoid a single end user monopolizing the resources of a workgroup printer, the number of pages able to printed in a given print job can be limited. Finally, in some organizations, the costs of processing print jobs can be allocated to each end user in a workgroup so as to ensure that no one employee over taxes the resources of a workgroup printer.

Of note, in many workgroup printing environments, workgroup members utilize workgroup printers for non-work related print jobs. While the occasional non-work related print job can be of little consequence, in a large enough organization, non-work related print jobs can unduly tax the resources of the workgroup printer to the detriment of work related print jobs. At present, work group administrators manage the printing of non-work related print jobs through a stated policy and the "honor system". Yet, in a large enough organization, printing non-work related print jobs to workgroup printers remains a source of managerial inefficiency.

BRIEF SUMMARY OF THE INVENTION

Embodiments of the present invention address deficiencies of the art in respect to workgroup printing and provide a novel and non-obvious method, system, and computer program product for managing categorized workgroup print jobs. In an embodiment of the invention, a method for workgroup management of non-work related print jobs includes receiving from an end user a print job designated for printing in a workgroup printer and categorizing the print job as work related or non-work related. Further, a remaining allocation of printer resources established for the end user can be determined. Even further, it can be determined whether or not printing the print job on behalf of the end user encroaches within a threshold value of the remaining allocation of printing resources established for the end user. Finally, in response to determining both that the print job is non-work related and also that the printing of the print job on behalf of the end user encroaches within the threshold value of the remaining allocation of printing resources established for the end user, further processing of the print job can be restricted.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for workgroup management of categorized print jobs.

FIG. 2 is a schematic illustration of a workgroup printing data processing system configured for workgroup management of categorized print jobs; and, FIG. 3 is a flow chart illustrating a process for workgroup management of categorized print jobs.

DETAILED DESCRIPTION OF THE INVENTION

Embodiments of the invention provide for workgroup management of categorized print jobs. In accordance with an embodiment of the invention, workgroup printing requests for processing print jobs in a workgroup printer can be inspected to categorize the content of the print jobs as being work related or non-work related. Work related print jobs can be processed customarily subject to resource restrictions such as cost or quantity limitations placed upon different workgroup end users submitting print jobs to the workgroup printer. In contrast, for non-work related print jobs, a restriction can be placed on the continued processing of the non-work related print jobs. The restriction can range from a warning issued electronically to the end user submitting the non-work related print job to the permitting of printing only if a threshold portion of a periodic printing allowance remains available for use by the end user.

In further illustration, FIG. 1 pictorially shows a process for workgroup management of categorized print jobs. As shown in FIG. 1, a print job 120 can be received from an end user 110 assigned to a workgroup printer 130. Workgroup printer management logic 150 can analyze the print job 120 to categorize the print job 120 as work related or non-work related. A workgroup allocation data store 140 can be consulted to ensure a sufficient remaining allocation of print jobs (either in terms of cost printing or quantity of pages)

exists for the submitting one of the end users 110 to support the print job 120. When a sufficient remaining allocation of print jobs does not exist or is within a threshold value of not being sufficient, if the print job 120 has been determined to be non-work related, the workgroup printer management logic 150 can restrict further processing of the print job 120, for instance by prompting the submitting one of the end users 110 to reconsider proceeding with the print job 120, or by outright blocking further processing of the print job 120.

Of note, the determination of whether or not the print job 120 is work related or non-work related can be achieved according to different methodologies. As one example, the content of the print job 120 can be parsed and keywords associated with work tasks identified. Alternatively, the content of the print job 12 can be parsed and keywords or even imagery associated with non-work tasks can be identified. As yet a further option, the source application for the print job 120 can be identified and determined to be work related or non-work related. For example, a print job for an enterprise application just as a general ledger, accounts payable, accounts receivable, order entry, customer relationship management or inventory module can be presumed to be work related whereas a Web browser can be viewed as non-work related. As yet a further example, a print job pertaining to a calendared event in a company collaborative computing environment or content provided in connection with a calendared event or e-meeting can be presumed to be work related. As even yet a further example, a print job pertaining to an e-mail from a person known from a company contact list to be an employee, agent, customer or vendor can be presumed to be work related.

The process described in connection with FIG. 1 can be implemented within a workgroup printing data processing system. In further illustration, FIG. 2 schematically shows a workgroup printing data processing system configured for workgroup management of categorized print jobs. The system can include a host server 250 with at least one processor and memory communicatively coupled to client computers 210 over computer communications network 230 and to a workgroup printer 240. Each of the client computers 210 can support the execution of one or more applications 220 submitting print jobs to the workgroup printer 240.

Workgroup printer management module 300 can be hosted for execution within the memory of the host server 250. The workgroup printer management module 300 can include program code enabled to respond to print job requests from the applications 220 by categorizing a print job as work related or non-work related. The program code further can be enabled to determine from a data store of workgroup printer resources whether or not an end user submitting the print job is within a threshold value of lacking a sufficient allocation of printer resources, such as an allocation of a specific dollar value of printing, or a specific number of pages, to process the print job. If so, for non-work related print jobs, the print job can be restricted, for example by quashing the print job at one extreme, or by prompting the submitting end user to consider not continuing with printing of the print job at the other extreme.

In yet further illustration of the operation of the workgroup printer management module 300, FIG. 3 is a flowchart illustrating a process for workgroup management of categorized print jobs. Beginning in block 320, an allocation of printing resources can be consulted for an end user and a print job in response to receiving a request to process the print job, as illustrated in block 310. In block 330, the print job can be analyzed to categorize the print job as work related or non-work related. Additionally, in block 330 the end user can be identified and a data store of workgroup printer resources can be consulted for the end user to identify a remaining allocation of print resources.

In block 340, it can be determined whether or not processing the print job will encroach upon a remaining allocation of printing resources for the end user within a threshold value that can range from zero. If not, in block 350 the print job can be submitted to the workgroup printer for printing. However, if it is determined that processing the print job will encroach upon a remaining allocation of printing resources for the end user within a threshold value, in decision block 360 it can be determined whether or not the print job is work related.

If the print job is determined to be work related, in block 370 an additional allocation can be requested for the end user to complete the print job. Otherwise, in block 380 the print job can be discarded and the end user notified that since the print job has been determined to be non-work related, the print job will not be submitted to the workgroup printer. Optionally, even if the print job is determined to be non-work related, if the print job is determined to relate to a calendared event scheduled to occur within a threshold period of time, then the print job, despite its non-work relatedness, can be submitted to the workgroup printer for printing along with a request for an additional allocation for the end user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for workgroup management of categorized print jobs, the method comprising:
   receiving from an end user a print job designated for printing in a workgroup printer;
   inspecting the print job to determine a source application that produced the print job, classifying the source application as being associated with a work task or a non-work task;
   determining that the print job is work-related responsive to the source application being classified as being associated with a work task, or determining that the print job is non-work related responsive to the source application being classified as being associated with a non-work task;
   determining in reference to a centralized data store of printer resource allocations for all end users of the workgroup printer, a remaining allocation of printer resources established for the end user;
   determining whether or not printing the print job on behalf of the end user encroaches within a threshold value of the remaining allocation of printing resources established for the end user;
   responding to a determination that the print job does not encroach upon the threshold value of the remaining allocation of printing resources irrespective of whether or not the print job is work related or non-work related by submitting the print job to the workgroup printer for printing;

restricting further processing of the print job in response to a determination both that the print job is non-work related and also that the printing of the print job on behalf of the end user encroaches within the threshold value of the remaining allocation of printing resources established for the end user;

responding to a determination that the print job is work-related and that the printing of the print job on behalf of the end user encroaches upon the threshold value of the remaining allocation of printing resources by submitting the print job to the workgroup printer for printing along with a request for an additional allocation of the printing resources; and responding to the print job being submitted to the workgroup printer for printing by printing the print job on the workgroup printer.

2. The method of claim 1, further comprising submitting the print job to the workgroup printer upon a determination that the print job pertains to a calendared event scheduled for within a threshold period of time despite restricting further processing of the print job because both of the following conditions are met: determining that the print job is non-work related and determining that the printing of the print job on behalf of the end user encroaches within the threshold value of the remaining allocation of printing resources established for the end user.

3. The method of claim 1, wherein the restricting comprises prompting the end user to consider canceling the print job.

4. The method of claim 1, wherein the restricting comprises canceling the print job.

5. The method of claim 1, wherein the remaining allocation is a remaining dollar value of printing.

6. The method of claim 1, wherein the remaining allocation is a remaining number of pages of printing.

7. A workgroup printing data processing system comprising:

a host server with at least one processor and memory configured for communicative coupling to a workgroup printer and a plurality of client computers over a computer communications network; and, a workgroup printer management module executing in the memory of the host server, the module comprising program code enabled:

to receive from an end user a print job designated for printing in the workgroup printer, to inspect the print job to determine a source application that produced the print job, classify the source application as being associated with a work task or a non-work task;

to determine that the print job is work-related responsive to the source application being classified as being associated with a work task, or to determine that the print job is non-work related responsive to the source application being classified as being associated with a non-work task;

to determine in reference to a centralized data store of printer resource allocations for all end users of the workgroup printer, a remaining allocation of printer resources established for the end user, to determine whether or not printing the print job on behalf of the end user encroaches within a threshold value of the remaining allocation of printing resources established for the end user, to perform responding to a determination that the print job does not encroach upon the threshold value of the remaining allocation of printing resources irrespective of whether or not the print job is work related or non-work related by submitting the print job to the workgroup printer for printing;

to restrict further processing of the print job in response to a determination both that the print job is non-work related and also that the printing of the print job on behalf of the end user encroaches within the threshold value of the remaining allocation of printing resources established for the end user;

to respond to a determination that the print job is work-related and that the printing of the print job on behalf of the end user encroaches upon the threshold value of the remaining allocation of printing resources by submitting the print job to the workgroup printer for printing along with a request for an additional allocation of the printing resources; and to perform responding to the print job being submitted to the workgroup printer for printing by printing the print job on the workgroup printer.

8. The system of claim 7, wherein the program code of the module submits the print job to the workgroup printer upon a determination that the print job pertains to a calendared event scheduled for within a threshold period of time despite restricting further processing of the print job when it is determined both that the print job is non-work related and also that the printing of the print job on behalf of the end user encroaches within the threshold value of the remaining allocation of printing resources established for the end user.

9. The system of claim 7, wherein the restricting comprises prompting the end user to consider canceling the print job.

10. The system of claim 7, wherein the restricting comprises canceling the print job.

11. The system of claim 7, wherein the remaining allocation is a remaining dollar value of printing.

12. The system of claim 7, wherein the remaining allocation is a remaining number of pages of printing.

13. A computer program product for workgroup management of categorized print jobs, the computer program product comprising:

a non-transitory computer readable storage medium having computer readable program code embodied therewith, the computer readable program code comprising:

computer readable program code for receiving from an end user a print job designated for printing in a workgroup printer;

computer readable program code for inspecting the print job to determine a source application that produced the print job, and classifying the source application as being associated with a work task or a non-work task;

computer readable program code for determining that the print job is work-related responsive to the source application being classified as being associated with a work task, or determining that the print job is non-work related responsive to the source application being classified as being associated with a non-work task;

computer readable program code for determining in reference to a centralized data store of printer resource allocations for all end users of the workgroup printer, a remaining allocation of printer resources established for the end user;

computer readable program code for determining whether or not printing the print job on behalf of the end user encroaches within a threshold value of a remaining allocation of printing resources established for the end user;

computer readable program code for responding to a determination that the print job does not encroach upon the threshold value of the remaining allocation of printing resources irrespective of whether or not the print job is work related or non-work related by submitting the print job to the workgroup printer for printing;

computer readable program code for restricting further processing of the print job in response to a determination both that the print job is non-work related and also that the printing of the print job on behalf of the end user encroaches within the threshold value of the remaining allocation of printing resources established for the end user;

computer readable program code for response to a determination that the print job is work-related and that the printing of the print job on behalf of the end user encroaches upon the threshold value of the remaining allocation of printing resources by submitting the print job to the workgroup printer for printing along with a request for an additional allocation of the printing resources; and computer readable program code for responding to the print job being submitted to the workgroup printer for printing by printing the print job on the workgroup printer.

14. The computer program product of claim 13, further comprising submitting the print job to the workgroup printer upon a determination that the print job pertains to a calendared event scheduled for within a threshold period of time despite restricting further processing of the print job when it is determined both that the print job is non-work related and also that the printing of the print job on behalf of the end user encroaches within the threshold value of the remaining allocation of printing resources established for the end user.

15. The computer program product of claim 13, wherein the restricting comprises prompting the end user to consider canceling the print job.

16. The computer program product of claim 13, wherein the restricting comprises canceling the print job.

17. The computer program product of claim 13, wherein the remaining allocation is a remaining dollar value of printing.

18. The computer program product of claim 13, wherein the remaining allocation is a remaining number of pages of printing.

* * * * *